(12) United States Patent
Gabrys et al.

(10) Patent No.: US 6,624,542 B1
(45) Date of Patent: Sep. 23, 2003

(54) FLYWHEEL POWER SOURCE WITH PASSIVE GENERATOR COOLING

(75) Inventors: Christopher W. Gabrys, Reno, NV (US); David R. Campbell, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 0 days.

(21) Appl. No.: 09/962,726

(22) Filed: Sep. 24, 2001

Related U.S. Application Data

(60) Provisional application No. 60/237,308, filed on Oct. 2, 2000, and provisional application No. 60/234,960, filed on Sep. 23, 2000.

(51) Int. Cl.[7] ............................................. H02K 9/00
(52) U.S. Cl. ........................... 310/54; 310/52; 310/74; 62/259.2
(58) Field of Search ...................... 62/259.2, 505; 310/54, 52, 74; 74/572; 165/104.33

(56) References Cited

U.S. PATENT DOCUMENTS

| | | | | |
|---|---|---|---|---|
| 3,541,487 A | * | 11/1970 | Leonard | 336/58 |
| 3,614,693 A | * | 10/1971 | Frey, III | 336/58 |
| 3,760,603 A | * | 9/1973 | Dicic | 62/505 |
| 4,048,528 A | * | 9/1977 | Whitney | 310/54 |
| 4,955,944 A | * | 9/1990 | Aso et al. | 123/41.31 |
| 5,245,270 A | * | 9/1993 | Akiyama | 322/4 |
| 5,723,923 A | * | 3/1998 | Clagett | 310/74 |
| 5,731,643 A | * | 3/1998 | Avakian et al. | 310/53 |
| 5,760,506 A | * | 6/1998 | Ahlstrom et al. | 310/74 |
| 5,969,446 A | | 10/1999 | Eisenhaure et al. | 310/74 |
| 6,150,742 A | * | 11/2000 | Horner et al. | 310/74 |
| 6,236,127 B1 | * | 5/2001 | Bornemann | 310/74 |

FOREIGN PATENT DOCUMENTS

| AT | 48361 | * | 5/1910 |
|---|---|---|---|
| FR | 592007 | * | 12/1924 |

* cited by examiner

Primary Examiner—Burton Mullins
(74) Attorney, Agent, or Firm—J. Michael Neary

(57) ABSTRACT

A flywheel power source having a flywheel supported by a bearing system for rotation inside an evacuated container. A brushless motor and generator is coupled to the flywheel for accelerating and decelerating the flywheel for storing and retrieving energy. The generator has a rotor coupled to the flywheel, and a stationary stator wound using multiple-strand individually insulated conductor wire coils. A heat energy transfer system passively cools the stator by heat transfer from the stator to an unpumped liquid coolant surrounding the coils and in intimate contact with the conductors in the coils. The stator is mounted in a stator coolant vessel that is partially filled with the coolant. The liquid coolant limits the maximum temperature of the coils during discharging of the flywheel power source.

24 Claims, 13 Drawing Sheets

Figure 1 - Prior Art

FLYWHEEL POWER SOURCE WITH PASSIVE GENERATOR COOLING

This relates to U.S. Provisional Application No. 60/234,960 filed on Sep. 23, 2000, and to U.S. Provisional Application No. 60/237,308 filed on Oct. 2, 2000.

This invention pertains to flywheel energy storage systems and more particularly to a flywheel power source with a heat transfer system for passively cooling the stator of the generator. The flywheel power source achieves an extended generator life and increased power capability with lower costs and higher reliability than previous flywheel systems.

BACKGROUND OF THE INVENTION

Flywheels have been used for many years as energy storage devices. They have often been used as power smoothing mechanisms for internal combustion engines and other kinds of power equipment. More recently, flywheels have been recognized as a very attractive energy storage technology for such electrical applications as uninterruptible power supplies, utility load leveling systems, satellites and electric vehicles.

Modern flywheel energy storage systems convert back and forth between a spinning flywheel's rotational energy and electrical energy. A flywheel energy storage system includes a flywheel, a motor/generator, a bearing system and a vacuum enclosure. The rotating flywheel stores the energy mechanically; the motor/generator converts between electrical and mechanical while the bearing system physically supports the rotating flywheel. High-speed flywheels are normally contained in a vacuum or low pressure enclosure to minimize aerodynamic losses that would occur from atmospheric operation while low speed systems can be operated at atmosphere.

In almost all UPS applications, whether quick discharge type (power ride-through), where discharge time is measured in seconds, or long-term discharge type (power backup), where discharge time is measured in hours, flywheels directly compete with electrochemical batteries. Power ride-through systems are usually for higher power (>50 kW) applications that can be coupled with a generator set. The flywheel supports the load for the first 30 seconds to 1 minute of the electrical interruption period until the generator can get up to speed or the electrical interruption has ceased. Back-up systems are usually for lower power (<50 kW) applications where the flywheel is expected to support the load for the duration of the electrical interruption period. Two key advantages of flywheels used for electrical energy storage over electrochemical battery systems are longevity and reliability. Electrochemical batteries, in particular, lead acid batteries, have short lifetimes, between two and seven years depending on operating conditions. These batteries require periodic maintenance and can fail unpredictably. In contrast, flywheel energy storage systems are expected to have lifetimes of at least twenty years and it is desirable not to require any maintenance. Such capability can offset the higher initial cost of the flywheel system over batteries by actually becoming cheaper when considered over the life.

All designs of flywheel motor/generators have electrical coil windings for conversion between electrical and magnetic energy used to apply torques to the rotating flywheel. The lifetime and reliability of the motor/generator is directly related to the dielectric insulator life of the insulation on the coil wires. After long-term operation, the dielectric strength of the insulation breaks down causing arcing and shorting. The lifetime of the insulation has been shown to follow a form of the Arrhenius Law with temperature. For a given insulation, the life is cut in half for every 6° C. operating temperature increase. Besides the loss of dielectric breakdown and insulator strength, high temperatures can also physically melt the insulation. One solution to increasing the life of the motor/generator is to use heavier and or higher temperature insulation. Using heavier insulation results in less space for the copper conductors, increasing their resistance and therefore the heat generated by the motor/generator. Heavier insulation also reduces the heat transfer from the coils. A physically larger motor/generator could be used to keep the higher efficiency with the heavier insulation but this significantly increases the cost of the motor/generator. This is especially true in flywheels where the high operating speeds (up to 40 krpm, 666 Hz) requiring use of expensive, very thin laminations to stack up the stator for reduction of eddy currents. Despite the increased costs of using a larger motor/generator, it is not a guaranteed solution to the problem. Size is usually limited by the stress capability of the rotor portion. Likewise, the stator laminations themselves and other metal components, if used, can be a larger source of heat generation through eddy current and hysteresis losses. No changes in the coil insulation can affect this generated heat. Further exacerbating the heat generation and removal from stators in flywheel power sources is that most designs place the stators inside the vacuum container for efficient magnetic coupling. This makes cooling and heat transfer from the flywheel stator much more difficult. High temperatures in the motor/generator can also have an added negative effect on the flywheel system in that the outgassing in the vacuum is strongly related to temperature. Insulation materials, in particular, already exhibit high vacuum outgass rates even at room temperature. Substantial outgassing of stator winding insulation can degrade the vacuum and require costly vacuum renewal steps or shorten the operating life of the flywheel power source.

The second method to extend the life of the flywheel system motor/generator is to actively keep the stator cool. With high power flywheel systems, dissipation of up to several kilowatts of heat power can be necessary. To date, such systems have employed pumped cooling systems. This method is effective in removing the heat but the weak link of the system reliability and longevity becomes the pump. To remove the heat, the liquid is also pumped outside the vacuum chamber. This requires the use of expensive, complicated and potentially unreliable fluid connections and fluid feedthroughs. One such flywheel system using forced liquid convection cooling is shown in FIG. 1. The flywheel power source 30 is comprised of a high speed flywheel 31 that rotates inside an evacuated chamber 35 within a container 34 to reduce aerodynamic drag. Flywheels can be constructed of composite materials such as carbon fiber/epoxy or of metals such as steel. As shown, the flywheel 31 is constructed with a carbon fiber epoxy rim 32 mounted on a solid metal hub 33. The flywheel 31 has upper and lower shafts 36 and 37 for journaling the flywheel and for attachment of a motor/generator 40. The flywheel is supported for rotation using upper and lower bearings 38 and 39. Flywheel systems typically employ mechanical bearings, magnetic bearings or a combination of the two types.

The motor/generator 40 is comprised of two portions: a rotor 41 that is attached to the flywheel, and a stator 42 that is stationary. The rotor can be a reluctance type motor/generator gear or alternatively permanent magnet type as shown. Any type of motor/generator can be used as long as it does not require brushes that wear. The rotor 41 is surrounded by and cooperates with the stator 42. The stator contains internal electromagnetic coils (not shown) for electrical-mechanical energy conversion with the rotor 41. In this case, the stator also includes internal laminations (not shown) for efficient completion of the motor/generator magnetic circuit. The stator 42, which is sealed inside the vacuum 35 to prevent a loss of vacuum, is cooled by pumping coolant through it. The coolant enters and exits the stator 42 and vacuum container 34 through inlet and outlet feedthroughs 43 and 44. A separate, and in this case external, pump and or cooler pumps the fluid. The forced convection from fluid is a highly effective method for removing the heat from the motor/generator. Unfortunately as described previously, this type of flywheel system has reduced reliability, and is complicated and expensive.

SUMMARY OF THE INVENTION

The invention provides a flywheel power source that is capable of high power operation with long life and whose cooling has high reliability with low costs. The realization of the invention is made possible by consideration of the operation of flywheel systems. Unlike previous flywheel systems with motor/generator cooling, the invention takes into account the actual service conditions of the flywheel system to provide more appropriate cooling. In high power flywheel systems, the highest power load is typically required only for a short period of time between very long low power conversion periods. This high power period is the result of discharging the flywheel from a fully charged state in a relatively short period of time. The actual damaging effects to the windings occur at the highest temperatures during this peak power operation. In almost all high power flywheel UPS applications, only the discharge of the flywheel is at very high power and the charging can be done at low power. If the flywheel is used for ride-through until an auxiliary generator set can turn on, the generator can be left running until both the power is restored and the flywheel is fully recharged. A high power recharge capability is not typically required. High power recharging from line power can also overload electrical supply lines in some cases and is not desired. Whether high power recharging is required for specific application or not, the period of time between high power operation can be days, weeks or months. When the flywheel is rotating at full speed and the system is fully charged, heat generation from losses is usually negligible. Only a small amount of power is required to maintain full speed in a well designed system. The goal of the flywheel cooling system is therefore most importantly to limit the maximum temperature and the duration of higher temperature during high power discharging, and optionally during charging cycles. Continuous pumping of cooling fluid is both unnecessary and it also reduces the longevity and reliability of the overall flywheel power source and increases the energy costs of operating the system.

The flywheel power source of the invention maintains cool generator operation passively by surrounding the generator stator coils with a sealed and partially filled liquid vessel in which heat energy from the stator is transferred to the liquid. The liquid absorbs the finite amount of heat energy generated from individual high power discharge cycles. Although forced convection by using a pumped fluid can provide as much as ten times higher heat transfer coefficients, it has contrarily been found that the maximum temperature of a flywheel stator can be sufficiently limited passively. Instead of staying at a near constant temperature, the liquid in the sealed vessel increases in temperature some amount, however the temperature of the stator is kept acceptable. One key to this is that the flywheel only stores a given amount of energy and therefore the amount of heat energy that can be generated and has to be absorbed is limited. The coolant absorbs the heat energy from the high power operation period and then that amount of energy is dissipated from the liquid over a long period of time. The cooling system of the invention would not be applicable for applications that require continuous or long-term high power operation but it uniquely matches the operation of flywheel power sources. The vessel is preferably substantially large to hold enough liquid for adequate cooling and heat energy absorption. The losses from the generator and the amount of heat energy to be transferred to the liquid is also reduced by winding the stator with multiple individually insulated conductor wires, or Litz wire, coils. By being only partially filled with the liquid, the vessel prevents rupture due to thermal expansion and increased pressure when heat energy is absorbed. The vessel can also enclose the stator laminations, if used, to cool them and in flywheel systems using a single combined motor/generator, cooling is also provided during recharging.

The passive cooling of the flywheel generator can work by two different embodiments. In both cases, heat is transferred from the stator to the liquid through both conduction and radiation. In one embodiment, the liquid inside the vessel efficiently absorbs much of the heat by natural convection and the heat capacity of the liquid. Natural convection works by the heated liquid having a different density than the cool liquid, causing it to flow and hence cool the motor/generator. Low viscosity of the liquid is essential to the efficacy of the process. The liquid has a low viscosity, preferably less than 200 $mm^2$/sec and more preferably less than 20 $mm^2$/sec at 40° C., for increased flow and better cooling. Because the vessel is sealed, no liquid escapes and needs to be replaced. The sealed vessel also prevents contamination of the vacuum from the fluid outgassing. Sufficient room without liquid is preferred inside the vessel to prevent excessive pressure from evolved gas that may occur over time and from thermal expansion of the fluid. After a short amount of time and before the next high power charging or discharging of the flywheel uninterruptible power supply, the vessel itself and internal liquid cools, resetting the generator or motor/generator for the next cycle. Many possible types of fluids can be used including water, oils, and others preferably nonconducting, noncorroding and with low viscosity. If water is the liquid, it is preferably pure and is not used when exposed corrosion prone laminations are in the vessel. The generator wires exit the sealed fluid vessel through use of electrical feedthroughs or other hermetic seals. The vessel itself is preferably constructed of a low electrical conductivity material or is made sufficiently thin to reduce magnetic induced losses. In one embodiment, dividers or a flow separator wall is included inside the vessel so as to increase the natural convection flow velocity over the stator and its effective cooling. In another embodiment, the level of the liquid can be contained to a height significantly higher than the stator so as to increase buoyancy and flow velocity. The vessel can also have a portion external to the flywheel vacuum container for cooling the oil.

The second embodiment for stator cooling is through the added energy absorption from heat of vaporization of the liquid. It is known that energy transfer through boiling of a liquid can be extremely high and it has been found that this mechanism can be employed to limit the high temperature experienced by a flywheel power source stator. In this case, radiation, conduction and natural convection are also occurring but an added large amount of heat is also absorbed by the transformation of the liquid to a gas. The vessel contains a fluid that has a relatively low boiling point inside the vessel. Some liquids that can be used include water, solvents like alcohol and fluorocarbons. These conveniently have low boiling temperatures at atmospheric pressure, however other liquids with different boiling points can also be employed by adjusting the internal pressure inside the vessel before sealing. When the flywheel power supply is intermittently charged or discharged at high power, the electrical windings become hot due to the resistive heating. If a ferromagnetic core is included in the motor/generator, it can also become hot due to eddy current and hysteresis losses. The liquid inside the vessel efficiently absorbs much of the heat by local vaporizing. Because the vessel is sealed, no vapor escapes and needs to be replaced. In this case, increased head space above the liquid level is needed inside the vessel to prevent excessive pressure. After a short amount of time and before the next high power cycle of the flywheel system, the vessel itself cools and the gas condenses, resetting the motor/generator for the next cycle. Some gas formed also condenses immediately during the discharge cycle and it transfers heat energy to the remaining liquid. By this mechanism, the stator is effectively cooled and much energy is distributed to the heat capacity of the liquid, reducing the internal pressure developed in the vessel. The bubble formation and rising further enhances free convection flow and cooling. Careful choice of the liquid, internal vessel pressure and the high power cycle losses is required in the vaporization cooling design. Care must be taken to prevent exceeding the critical heat flux of the liquid, in which case heat transfer becomes reduced by the increased gas formation actually insulating the heat generating surfaces. However, as the pressure in the vessel increases, so does the boiling temperature of the liquid because of the sealed container and in some cases this can be beneficial in preventing transition from nucleate to film boiling.

DESCRIPTION OF THE PREFERRED EMBODIMENT

Figure 1:
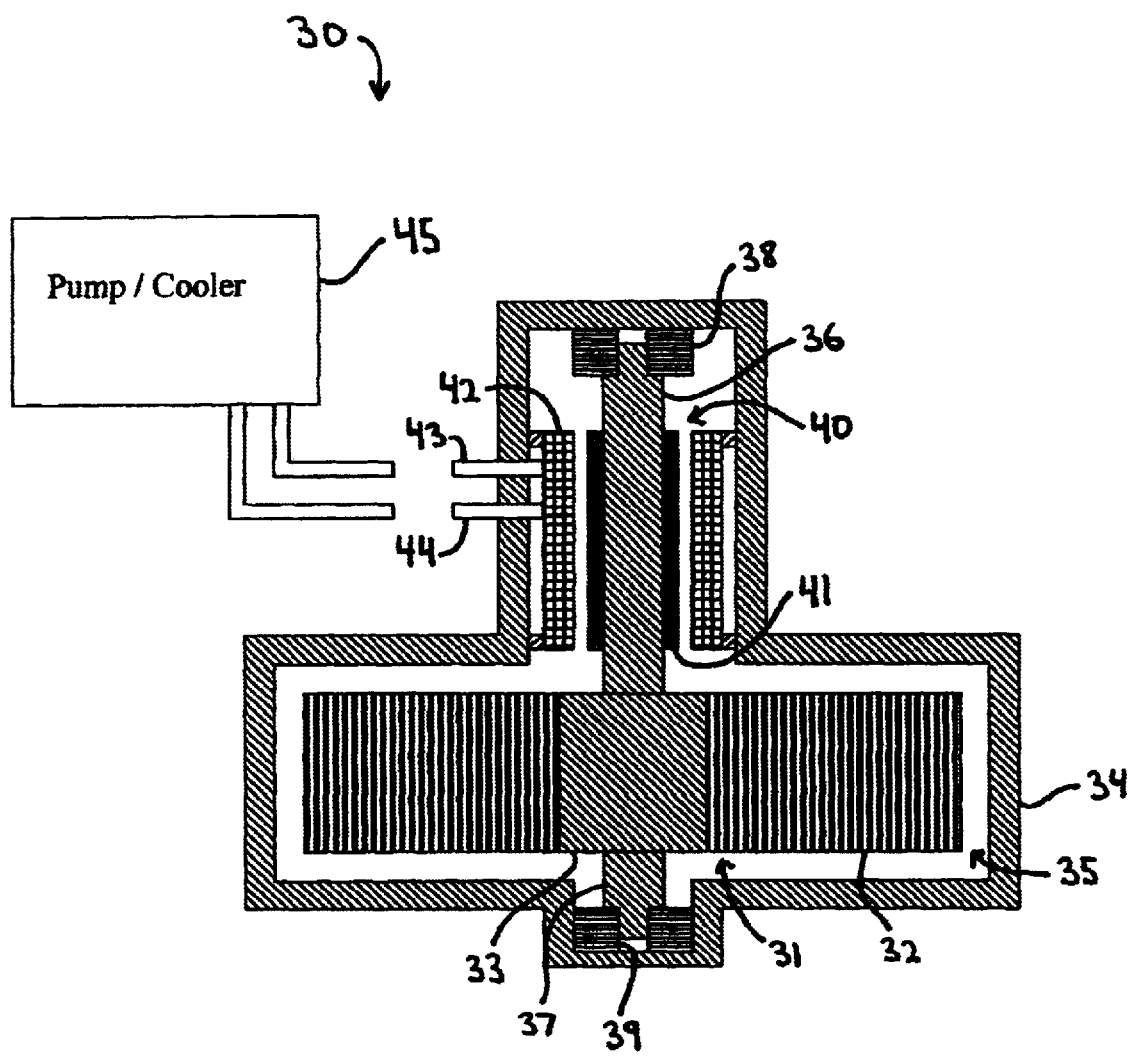
FIG. 1—Schematic drawing of a flywheel power source with forced convection liquid cooling, not in accordance with the invention.
Figure 2:
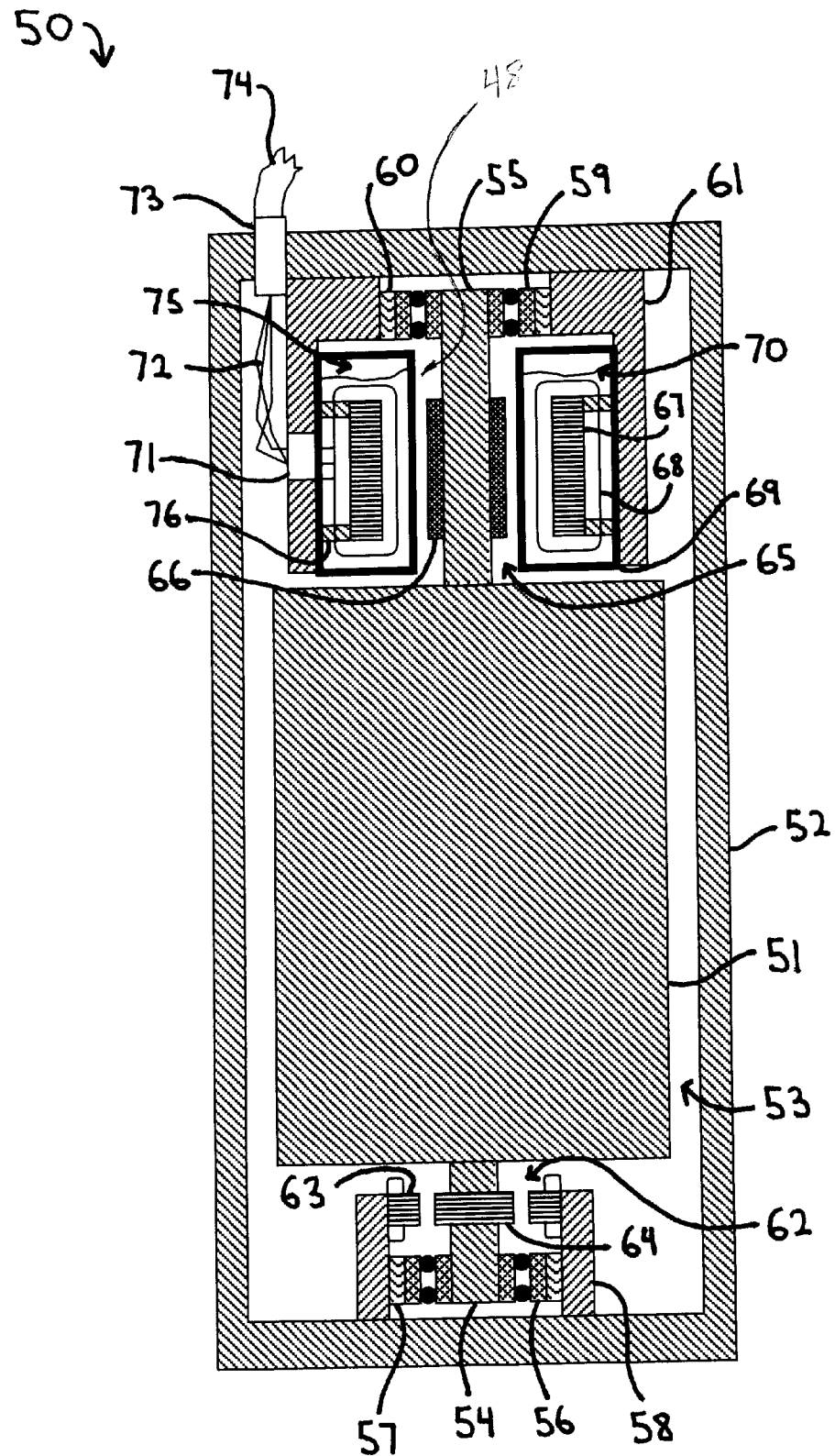
FIG. 2—Schematic drawing of a flywheel power source with passive generator cooling in accordance with the invention.

Turning to the drawings, wherein like characters designate identical or corresponding parts, and more particularly to FIG. 2 thereof, a flywheel power source 50 with passive generator cooling system 48 in accordance with the invention is shown. The flywheel power source 50 stores energy in a high speed flywheel 51 that rotates in an evacuated chamber 53 within a container 52, preferably buried underground. Flywheels for use with the invention can be constructed of composite materials or metals such as the steel flywheel 51 shown. The flywheel 51 has upper and lower shafts 55 and 54, which connect to upper and lower bearings 59 and 56 that support it for rotation. Several types of bearings can be employed with flywheel power systems of the invention including mechanical, magnetic or a combination. As shown, the bearings 59, 56 are mechanical ball bearings that are mounted using spring dampers 60 and 57 to the upper and lower housings 61 and 58.

To accelerate and decelerate the flywheel 51 for storing and retrieving energy, a motor 62 and generator 65 are employed. In applications where fast recharging is not required, the motor 62 can be made small. The motor 62 includes a motor rotor 64 that is attached to the flywheel shaft 54 and a stator 63 that is attached to the housing 58. The motor is preferably a brushless type that can include induction, permanent magnet or reluctance designs. The motor accelerates the flywheel 51 to full speed when line power is available and provides a small amount of torque to maintain full speed. The generator 65 is used to convert rotational inertia in the flywheel 51 to electrical power when line power fails or is unavailable.

Because the discharge of the flywheel 51 is at a high power level, the generator 65 is sufficiently large to generate high power and its losses can generate significant heat. For example a flywheel power source storing 3 kilowatt-hours of energy can supply roughly 350 kilowatts of power for 30 seconds. If the generator is 97% efficient, the generator also produces more than 10 kilowatts of heat power during the discharge and 90 watt-hours of heat energy that must be absorbed. The passive generator cooling system 48 for the flywheel power source absorbs this energy and prevents generation of excessive temperatures that would damage the generator coils, insulation and or laminations. Because of the finite amount of heat energy to be absorbed per discharge cycle, unique to flywheels compared to conventional high power continuous or longer term generator applications, the cooling of the generator stator can be done passively. It is not important that the stator temperature be maintained at near room temperature such as is possible with a forced convection actively pumped cooling system. It is only important to limit the maximum temperature and the duration of higher temperatures so as to prevent damage or excessive loss of life. The life of dielectric insulation on electrical coils is reduced in half for approximately every 6° C. increase in temperature.

The passive generator cooling system 48 has a stator vessel 69 that is partially filled with a cooling liquid 70 to absorb heat energy generated during discharging of the flywheel power source. Between cycles, the liquid cools slowly by heat conduction from the vessel to the surrounding upper housing 61 and the container 52, thence to ground. A head space 75 above the liquid level in the vessel 69 prevents rupture from thermal expansion of the liquid or any internal pressure increases. The stator vessel 69 also surrounds the stator coils 68 and in this case it also surrounds the entire stator laminations 67. The vessel 69 is sealed to prevent loss of liquid 70 or contamination of the flywheel vacuum 53. A separate motor and generator could also be used which would allow for less recovery time between charging and discharging. The coils 68 of the generator are constructed from multiple individually insulated conductor wire or Litz wire for low eddy current losses and low heat generation. The losses in the coils 68 during a discharge are from resistive ohmic losses and from eddy currents generated inside the coil conductors themselves. The generator 65 has a generator rotor 66 that is attached to the flywheel shaft 55 and cooperates with the stator coils 68 for electromechanical energy conversion. The stator laminations 67 are held in place inside the vessel 69 with supports 76.

The coolant 70 in the stator vessel 69 provides cooling for the generator during discharging of the flywheel, cooling that would otherwise be very poor due to the vacuum inside the flywheel container 52. The heat generated by the stator 68 is transferred to the liquid 70 through conduction and radiation and also very significantly through natural convection of the liquid. For considerable natural convection heat transfer, the liquid 70 preferably has a low viscosity. The viscosity is preferably less than 200 $mm^2$/sec and more preferably less than 20 $mm^2$/sec at 40° C., for increased flow and better cooling. Many low viscosity liquids can be used and some include water and transformer or silicone oils. The liquid is preferably non conducting unless total insulative protection can be taken, and is non corrosive and is chemically stable. The liquid can also add to the dielectric strength between adjacent stator coils 68, militating against breakdown.

The wires 72 for the stator coils 68 exit the stator vessel through an electrical feedthrough 71 or other hermetic seal. The stator vessel 69 is preferably constructed to have reduced electromagnetic losses. It can be constructed from plastic or other nonelectrical conductor, however such materials tend to outgass in the vacuum 53. They can be metal coated to reduce outgassing. Another alternative is to construct the stator vessel from a metal with high resistivity such as stainless steel but to make the wall thicknesses thin so as to reduce the amount of eddy current generated heat. The generator wires 72 exit the container 52 through use of another electrical feedthrough 73 to which external cabling 74 is connected.

Figure 3:
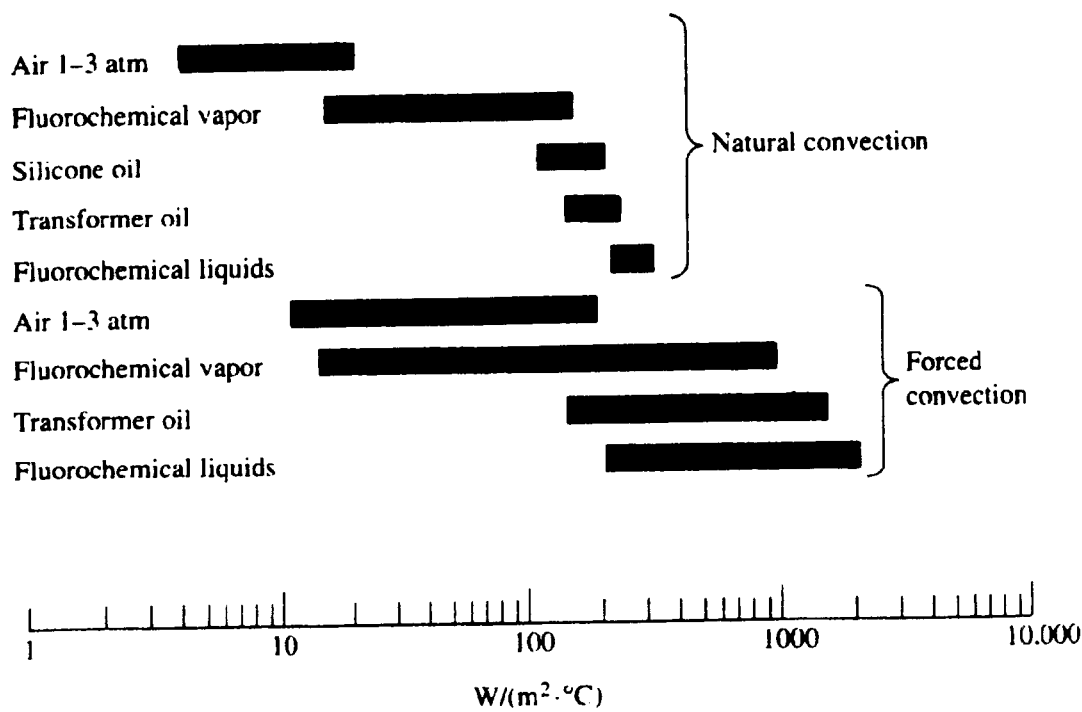
FIG. 3—Comparison of heat transfer coefficients for different liquids with natural and forced convection.

A comparison of typical heat transfer coefficients for various fluids is shown in FIG. 3. As illustrated, convection with liquids offers higher heat transfer than with air and forced convection is much better at removing heat than natural convection. Forced convection can be as much as ten times more effective in transferring heat than natural convection. For this reason, prior art flywheel systems have employed pumped liquid cooling. However, use of a pumped system is less desirable because it reduces the reliability and increases the costs of a flywheel power source. It has uniquely been found that if the actual expected operating cycle is considered along with the needs for providing flywheel motor/generator cooling, a passive liquid cooling system can be achievable. Almost all high power flywheel systems will experience relatively short periods of high power operation between long periods of low power operation. Because of the finite energy storage capacity of a given flywheel, the total amount of heat energy to be absorbed during discharge, and the rate of heat generation during the discharge period is finite and can be calculated accurately. The need for cooling the generator or motor/generator of the power source is not necessarily to keep the temperature near constant. Instead, the cooling needs only to prevent damage or unwarranted deterioration from excessively high temperature. Limiting the temperature achieved by the stator windings also provides the benefit of preventing a large increase in its electrical resistance which can adversely affect the performance of the flywheel a power source.

The stator is mounted inside the coolant vessel 69 by constructing the vessel with an open side or top. The stator is inserted and can be mechanically fastened to integral mounts in the inside of the vessel 69, or can be bonded in place. The electrical connections can be made with the electric feedthroughs. The feedthroughs are preferably welded to the vessel prior to inserting the stator. Alternatively, an epoxy or bonded electrical feedthrough seal could be used. Once the stator is installed, the vessel can be closed by attaching and sealing the lid. Liquid can be added prior to installing the lid or the liquid can be added through a separate fill port that is later sealed. The stator vessel is then installed in the flywheel power source.

The coolant vessel 69 may be constructed of various materials. Plastics can be used and they allow for the vessel to be molded for low cost manufacturing. Plastics do outgas significantly more than metals, thus depending on how the vacuum is maintained in the flywheel power source, it may be preferable to metal coat a plastic vessel. The vessel can also be made from metal, however consideration of electromagnetic losses must be taken. Making the vessel walls very thin can reduce the amount of heat generated by the vessel and lower electrical conductivity and low magnetic permeability metals also help. Stainless steel has good properties and a vessel constructed from it can be made very thin walled, as small as 0.005". Suitable reinforcing may be needed to resist the pressure drop across the vessel walls between the evacuated chamber 53 and the interior of the vessel 69, which may be under pressure during discharge of the flywheel power source. If a metal vessel is used, it can be formed with a very thin wall by soldiering, brazing or welding. Use of a metal vessel can simplify use of a pinch-off tube for sealing.

After the stator is inserted and the lid is welded on, the vessel can be filled with the liquid through the pinch off tube. The pinch-off tube is simply crimped to seal it and it can also be epoxied or brazed for extra measure. The pinch off tube allows for sealing with an internal pressure or vacuum, which may be desirable, by supplying pressure or vacuum through the tube prior to crimping. Regardless of the material of the vessel construction, it must be able to withstand the internal pressure in combination with the external vacuum.

Figure 4:
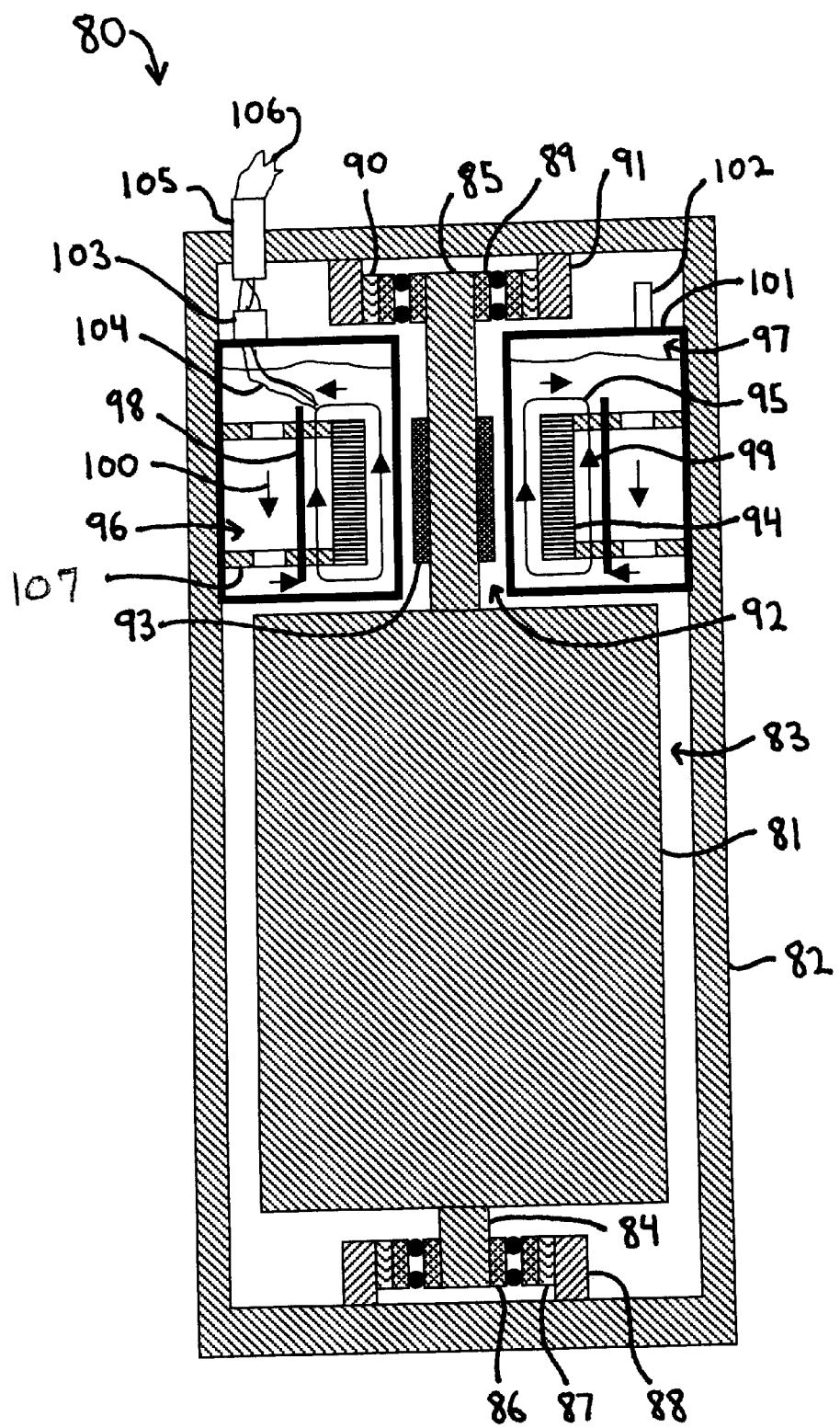
FIG. 4—Schematic drawing of an alternate configuration flywheel power source with passive generator cooling in accordance with the invention.

An alternate configuration flywheel power source with passive generator cooling in accordance with the invention is shown in FIG. 4. The flywheel power source 80 has a high strength steel flywheel 81 that rotates at high speed inside an evacuated chamber 83 of a container 82. The flywheel 81 has upper and lower shafts 85 and 86 that are journalled in upper and lower mechanical bearings 89 and 86. The bearings 89, 86 are mounted to upper and lower bearing supports 91 and 88 using compliant mounts 90 and 87. The flywheel 81 is accelerated and decelerated for storing and retrieving energy by a combined motor/generator 92. The motor/generator 92 has a permanent magnet rotor 93 attached to the flywheel shaft 85. A reluctance or other brushless type motor/generator could alternatively be used.

The rotor 93 is surrounded by a stator 95 of the motor/generator 92. The stator consists of a laminated core 94 and multi-phase Litz wire wound coils 95. The coils 95 can be potted in epoxy or thermally conductive epoxy to fix them or can be left unpotted for direct heat transfer and mechanically secured. Likewise, the Litz wire is available in either single film insulated strands that prevents internal cable eddy currents or with an additional outer cable insulation which can be useful to prevent abrasion damage in unspotted constructions. This low loss wire is offered from New England Electric Wire Corporation.

The stator 95 is cooled with a liquid coolant circulating around the stator coils with natural convection in a coolant vessel 101. Depending on the liquid coolant chosen, compatibility with the stator winding insulation should be considered to insure long life operation. Polyimide insulation coating is preferred for allowing the highest temperature capability however lower temperature insulations such as polyurethane, polyvinyl formal or polyester may have better compatibility with different the cooling liquids. A combination of polyester with a polyamide-imide overcoating can provide the best overall properties of chemical and thermal resistance. Operation up to 200° C. is possible. In this configuration of a flywheel power source in accordance with this invention, the natural convection cooling of the stator is enhanced by the addition of a divider 98 or flow channels in the stator vessel 101. The interior 96 of the vessel 101 is partially filled with liquid coolant with sufficient empty space 97 above the liquid level to allow for thermal expansions. The divider 98 increases convection heat transfer by increasing the flow velocity of the liquid coolant around the stator coils 95. As indicated by the arrow 99, the liquid travels vertically up past the stator coils 95 due to the lower density of heated fluid and circulates downward as indicated by arrow 100 away from the coils. A support structure 107 with integral openings to provide for liquid flow is used to mechanically support the stator laminations 94 and windings 95. An electrical feedthrough 103 allows electrical penetration of the vessel 101. A filling and pinch-off tube 102 allows the coolant liquid to be added and for the vessel 101 to be sealed. The pinch off tube can be simply pinched off or can also be welded, brazed or bonded closed for added assurance. Other vessel sealing methods could also be applied. The motor/generator wires 104 exit the vacuum 83 through use of another electrical feedthrough 105 and connect with external cabling 106.

Figure 5:
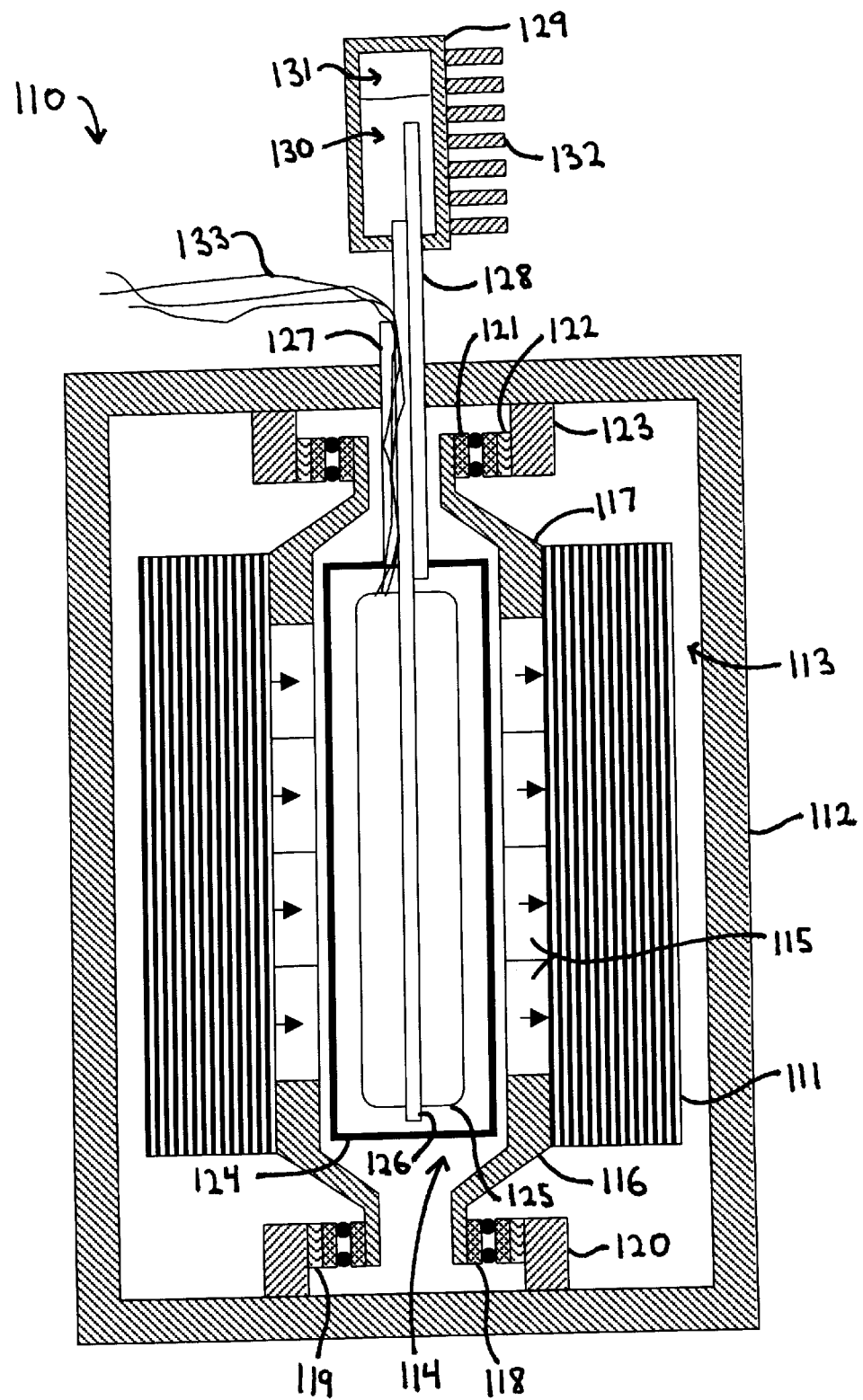
FIG. 5—Schematic drawing of a second alternate configuration flywheel power source with passive generator cooling in accordance with the invention.

A second alternate configuration flywheel power source with passive generator cooling in accordance with the invention is shown in FIG. 5, wherein the flywheel power source 110 is shown with other possible system configurations. The power source 110 has a composite flywheel rim 111 with an internal air core motor/generator 114. The rim 111 can be wound from glass fibers, carbon fibers, a combination of the two or others in a resin matrix such as epoxy to provide high hoop direction strength to match the high hoop stress loading. The rim 111 spins inside an evacuated chamber 113 enclosed by a container 112. The rim 111 is supported for rotation on upper and lower hubs 117 and 116 that allow for the growth of the rim 111. The hubs 117, 116 are journalled for rotation on upper and lower bearings 121 and 118. The bearings 121, 118 are connected to upper and lower bearing supports through use of compliant mounts 122 and 119. The motor/generator rotor 114 includes magnets 115 that are supported and reinforced for high-speed rotation by the rim 111. The stator is located in the center and is comprised of multiple Litz wire wound coils 125 supported preferably by a stationary non-magnetic support (not shown).

Surrounding the stator coils 125 is a stator vessel 124. The vessel 124 communicates via pipes 126 and 128 through the top of the container 112 to an upper auxiliary vessel 129. The vessel 124 could be contained completely inside the vacuum 113 as shown previously, however this configuration shows an alternate approach. The external upper auxiliary vessel 129 can use radiator fins 132 to conduct heat from the coolant liquid 130 to the ambient air or graound to more rapidly cool the liquid 130 between high power operation periods. Sufficient extra space 131 is provided above the liquid level in the auxiliary vessel 129 to prevent system rupture. The upper auxiliary vessel 129 can be used as a convenient location for filling the liquid 130. It should be noted however that having an extra auxiliary vessel 129 outside the vacuum adds cost and complexity compared with fully enclosed designs. Keeping the stator vessel 124 sealed prevents loss of fluid 130, contamination of the fluid and oxidation.

The flywheel power source 110 also embodies another aspect of the invention, which is to extend the fluid level significantly above the stator windings 125. The extra height of fluid increases buoyancy and speeds the natural convective fluid flow and cooling. The fluid return tube 126 is extended to the bottom of the stator vessel 125 and the exit tube 128 conveys the heated fluid from the top of the stator. The stator wires 133 exit the container through a stator connection tube which is sealed to prevent leakage of fluid.

Figure 6:
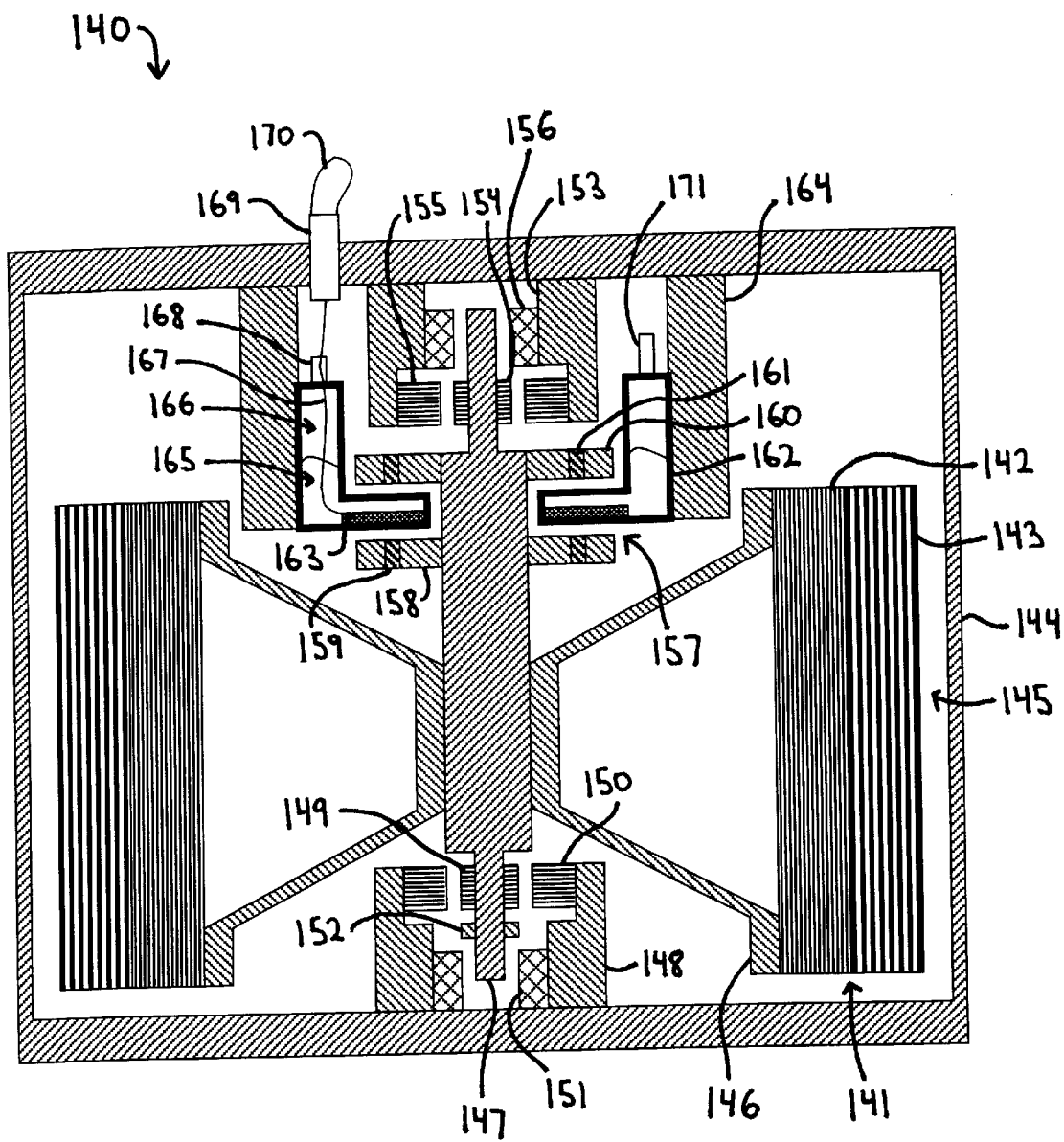
FIG. 6—Schematic drawing of a third alternate configuration flywheel power source with passive generator cooling in accordance with the invention.

A third alternate configuration flywheel power source 140 with passive generator cooling in accordance with the invention, shown in FIG. 6, has a composite flywheel 141 that rotates within an evacuated chamber 145 enclosed in a container 144. The flywheel 141 is a hoop wound biannular rim made with a glass fiber portion 142 inside an outer carbon fiber portion 143. The glass fiber portion 142 grows into the higher stiffness and lower density carbon fiber portion 143 to allow high speed rotation as is well known in the art. The rim 141 is connected to a central shaft 147 through use of a conical hub 146. This power source 140 illustrates further possible system attributes that can be employed in conjunction with the invention. The flywheel 141 is supported for rotation on magnetic bearings. The shaft 147 contains upper and lower magnetic bearing rotors 154 and 149 that are magnetically journalled through magnetic forces provided by cooperating upper and lower magnetic bearing stators 155 and 150. When the magnetic bearings are not operating, the shaft 147 is supported by upper and lower auxiliary bearings or bushings 156 and 151. The bushings 156, 151 are mounted to upper and lower bearing supports 153 and 148. An axial shaft collar 152 provides an axial stop to engage the lower auxiliary bushing 151.

The flywheel 141 is accelerated and decelerated for storing and retrieving energy with an integral brushless motor/generator 157. The motor/generator 157 is an axial gap design using rotor disks 158 and 160 that contain axially magnetized permanent magnets 159 and 161. The permanent magnets 159, 161 produce a rotating axial magnetic field with the rotation of the flywheel 141. Between the rotor disks 158, 160 is located the motor/generator stator and multiple individually insulated conductor stator coils 163. A stator vessel 162 surrounds the coils 163 and extends radially outward and axially upward. The vessel 162 contains a cooling liquid 165 and extra internal space 166 above the liquid level in the vessel. An electrical feedthrough 168 allows electrical wire penetration to the chamber 145, and a pinch-off tube 171 allows for filling and sealing the vessel 162, preferably before installation into the container 144. The vessel 162 is supported by a stator support cylinder 164.

In this case, another embodiment of the invention is shown by the stator support being constructed as a large thermal heatsink to promote cooling of the liquid. A thermally conductive material such as copper is preferably used to efficiently carry heat away. The motor/generator wires 167 exit the vacuum 145 through an electrical feedthrough 169 and attached external cabling 170.

Figure 7:
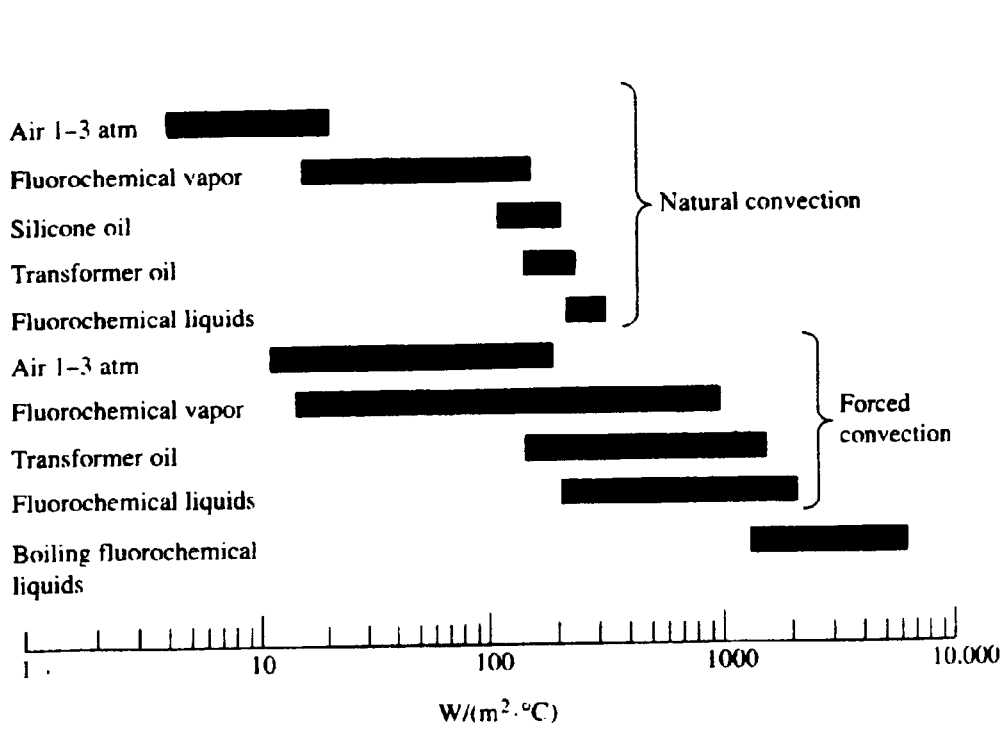
FIG. 7—Comparison of heat transfer coefficients for different liquids with natural and forced convection and also liquid boiling.

Although passive cooling through natural convection of a liquid filled stator vessel is capable of providing necessary flywheel stator cooling in many cases, passive cooling can be significantly improved by yet another embodiment of the invention. Passive stator cooling can be dramatically increased by using heat of vaporization of the liquid for energy absorption. The liquid and internal vessel pressure are chosen such that when the flywheel discharges, the heat generated in the stator windings causes the coolant liquid to boil. Boiling of liquids absorbs large quantities of heat energy. This embodiment of the invention allows even higher power generator or motor/generator operation and or increased high power duration. It can allow the stator coils to operate even cooler and prevent higher increases in stator resistance and extend the stator insulation life. A comparison of heat transfer coefficients for different liquids with natural and forced convection and also liquid boiling is shown in FIG. 7. As previously shown, forced convection provides much higher heat transfer coefficients than does natural convection. However, boiling of liquids can provide a heat transfer rate twice as high as forced convection for the same fluid. As shown, boiling of fluorochemical liquids is compared with natural and forced convection. The maximum heat transfer for natural convection is 300 W/(m$^2$ ° C.). Forced convection increases that to 3000 W/(m$^2$ ° C.) and boiling allows greater than 6000 W/(m$^2$ ° C.). This high heat transfer is also achieved passively, allowing both the highest cooling rates and highest reliability. Fluorocarbon liquids are not to be confused with environmentally unfriendly fluorochloro fluids.

Figure 8:
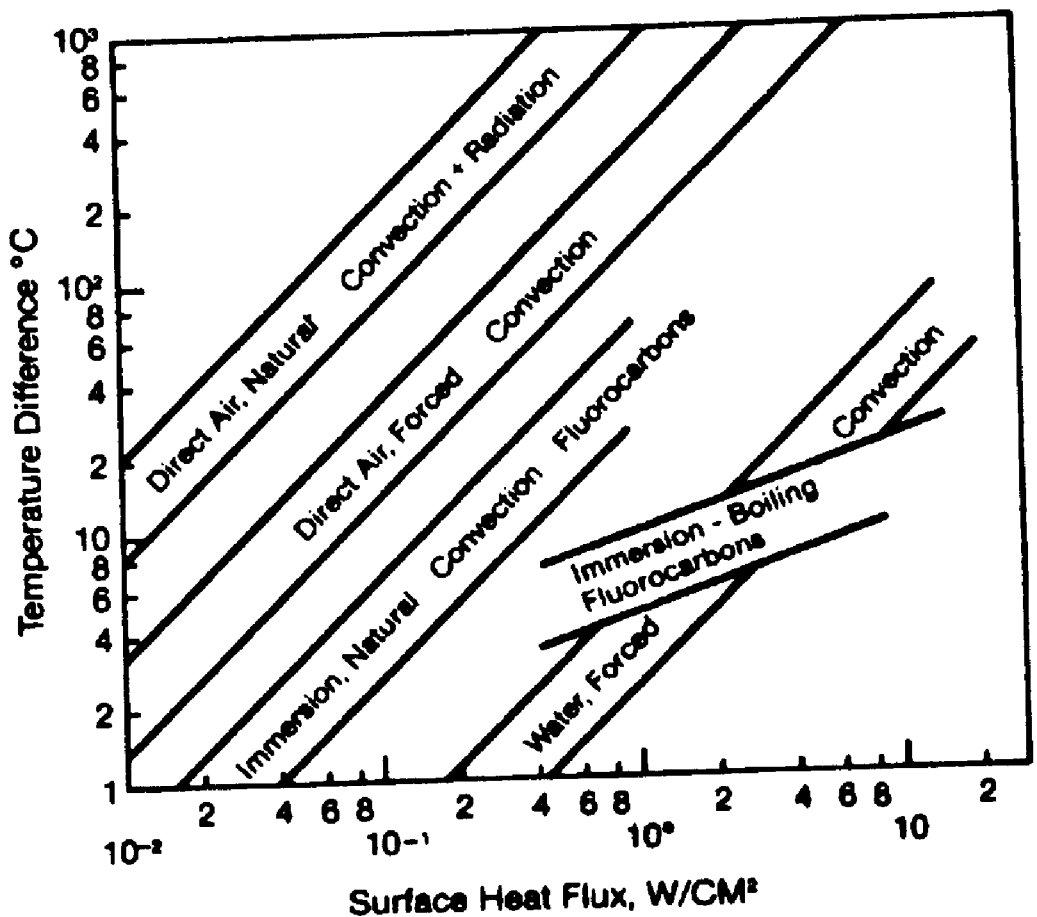
FIG. 8—Temperature differences attainable as a function of heat flux for various fluids and heat transfer modes.

To show the effectiveness in limiting the maximum temperature of the stator during a high power discharge from a flywheel stator vessel employing liquid boiling, the temperature difference between the stator and surrounding liquid can be compared. The temperature differences attainable as a function of heat flux for various fluids and heat transfer modes is shown in FIG. 8. Again boiling of a fluorocarbon liquid allows the highest surface heat fluxes with a minimum of temperature difference. Therefore, a high power cycle of the flywheel power source generating high power heat energy loss results in the lowest temperature increase in the stator. Although the graph only shows boiling for fluorocarbon liquids, many types of liquids can be used including water, solvents such as alcohol or refrigerants. Fluorocarbons are very desirable because they are readily available with boiling temperatures between 30° C. and 100° C. at atmospheric pressure and they are electrically non-conducting, non-corrosive, non-flammable and a dielectric. If water is used, it offers the advantage of lowest cost and extremely high heat of vaporization energy. Precautions need to be taken to prevent any stator corrosion or electrical shorting. If a flammable solvent or other flammable liquid is used, precautions need to be taken to prevent combustion such as removing any oxygen prior to sealing the stator vessel. The use of solvents or other cooling liquids may require insulation on the winding coil wires or laminations, if present, that is not attacked by the cooling fluid.

No matter which liquid is chosen, the stator vessel must leave extra space above the liquid level in the stator vessel so as to prevent excessive pressure that could rupture the stator vessel. Careful calculation of the efficiency of the generator or motor/generator, amount of energy transferred per charge or discharge cycle and heat transfer to the fluid and vaporization should be done to keep the pressure inside the vessel acceptable. During a high power cycle of the flywheel power source, a finite amount of heat energy is produced by the motor/generator. This heat energy is transferred to the cooling liquid and a large portion of that energy is absorbed by locally boiling the liquid. By boiling the liquid, energy is efficiently absorbed without an otherwise larger increase in the stator surface temperature. Some of the energy is also absorbed as strain energy in the vessel due to the internal vessel pressure. After the discharge cycle is complete, the gas generated from boiling cools and condenses, resetting the flywheel power source for the next discharge cycle. Because the vessel is sealed, no fluid escapes and the cooling can operate both very efficiently and also reliably for many years. It should be noted that the boiling of the liquid occurs simultaneously and in conjunction with radiation, conduction and natural convection of the fluid. The boiling also increases the flow rate and improves natural convection cooling. If the energy from a high power discharge is considered to be transferred only to heat of vaporization of the liquid, a large amount of gas is created. For a 5 kilowatt absorption for 30 seconds with water coolant, 66 grams of liquid would be converted to gas, creating 82 liters of water vapor at atmospheric pressure. If the stator vessel had a very large empty space of 10 liters, the pressure would rise to the high level of 138 psi. Surprisingly, it has been found that this is not the case. Fortunately, the energy may majority be converted to heat of vaporization energy at the stator or coil conductor surface, which limits the coil temperature. However, some of the energy from the water vapor is then quickly transferred to the remaining liquid. The bubbles transfer heat energy raising the average temperature of the water through energy absorption of the heat capacity of the water. Also, because the water or liquid average temperature is below the boiling temperature or saturation temperature the boiling is regarded as subcooled boiling. Thus, much of the bubbles tend to condense in the fluid. Therefore, less gas is created along with less pressure inside the stator vessel and effectively less empty space and a smaller stator vessel can be employed. In applications other than a flywheel, such as a long duty cycle or continuous high power operating application, this cooling method could not be employed. Eventually all of the liquid would be vaporized and the pressure in the vessel would exceed the strength of the vessel.

Figure 9:
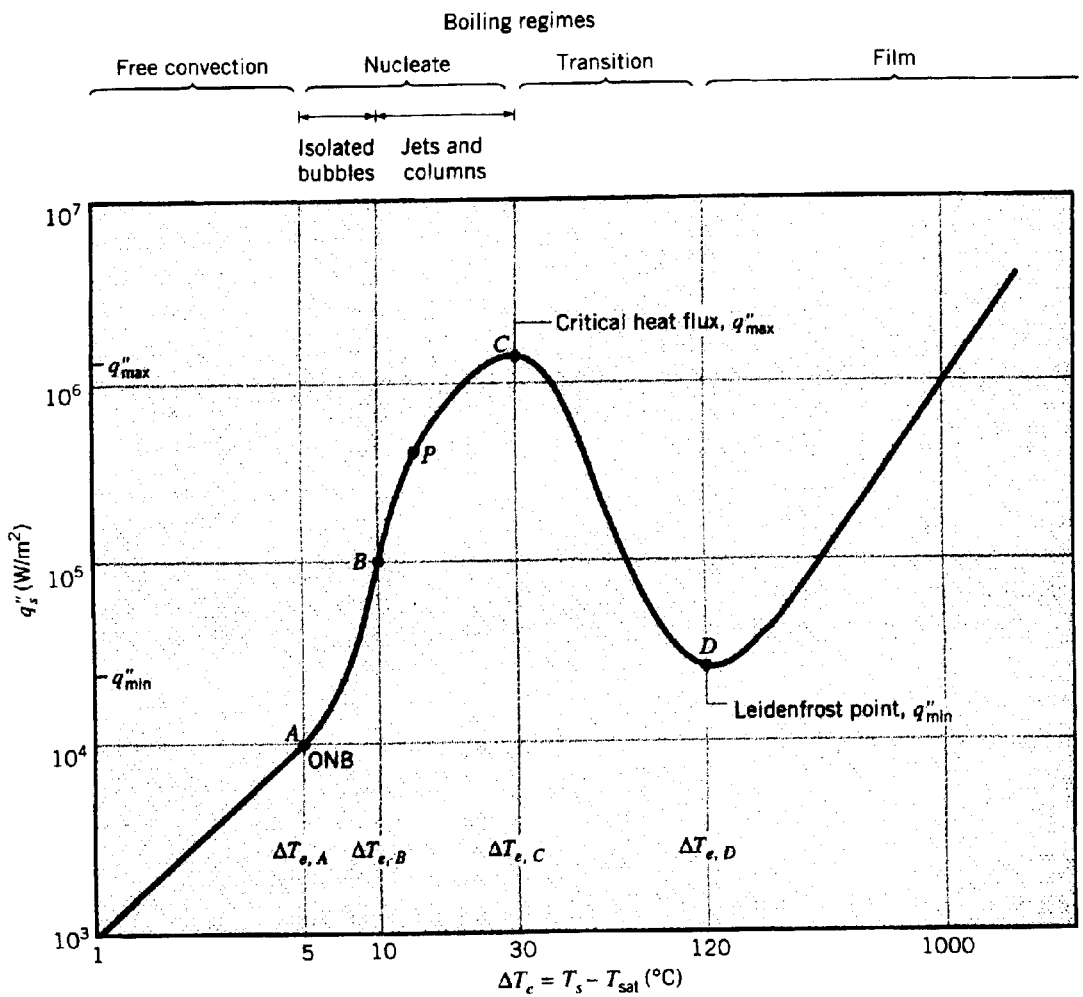
FIG. 9—Typical boiling curve for water at 1 atmosphere pressure.

Using any liquid with a boiling temperature below the allowable stator temperature is not enough to insure proper passive cooling of the stator. Boiling of a liquid is a complex phenomenon. When the temperature of a liquid reaches the boiling temperature for a given pressure, the liquid is saturated. The liquid surrounding a hot object will start to form bubbles on the hot object. When the bubble formation becomes large enough to separate from the surface this called nucleate boiling. As the temperature of the stator is increased, the heat transfer from the stator to the liquid increases until the critical heat flux is reached. A typical boiling curve for water at 1 atmosphere pressure is shown in FIG. 9 as a function of the temperature difference between the stator and the boiling temperature of water. The critical heat flux is the largest transfer of heat energy that can be imparted from the stator to the liquid. When the stator is heated above the corresponding temperature, the transfer of heat energy to the liquid actually decreases. The cause for this is that the boiling is transitioning from nucleate boiling to film boiling. In film boiling, it becomes difficult for liquid to continuously wet the stator surface. As a result the vapor film on the stator actually thermally insulates the stator. Transfer of energy from the stator to the liquid occurs only by radiation and by conduction through the vapor. The point of minimum heat flux is referred to as the Leidenfrost point. To properly design the stator cooling for maximum heat energy absorption with minimum temperature increase of the stator, it is preferable to design to stay below the critical heat flux for the liquid and pressure, and stator surface size.

All of the previous configurations of flywheel power sources can be used with the liquid boiling embodiment. Ample extra space to account for gas creation needs to be included in the stator vessel.

Figure 10:
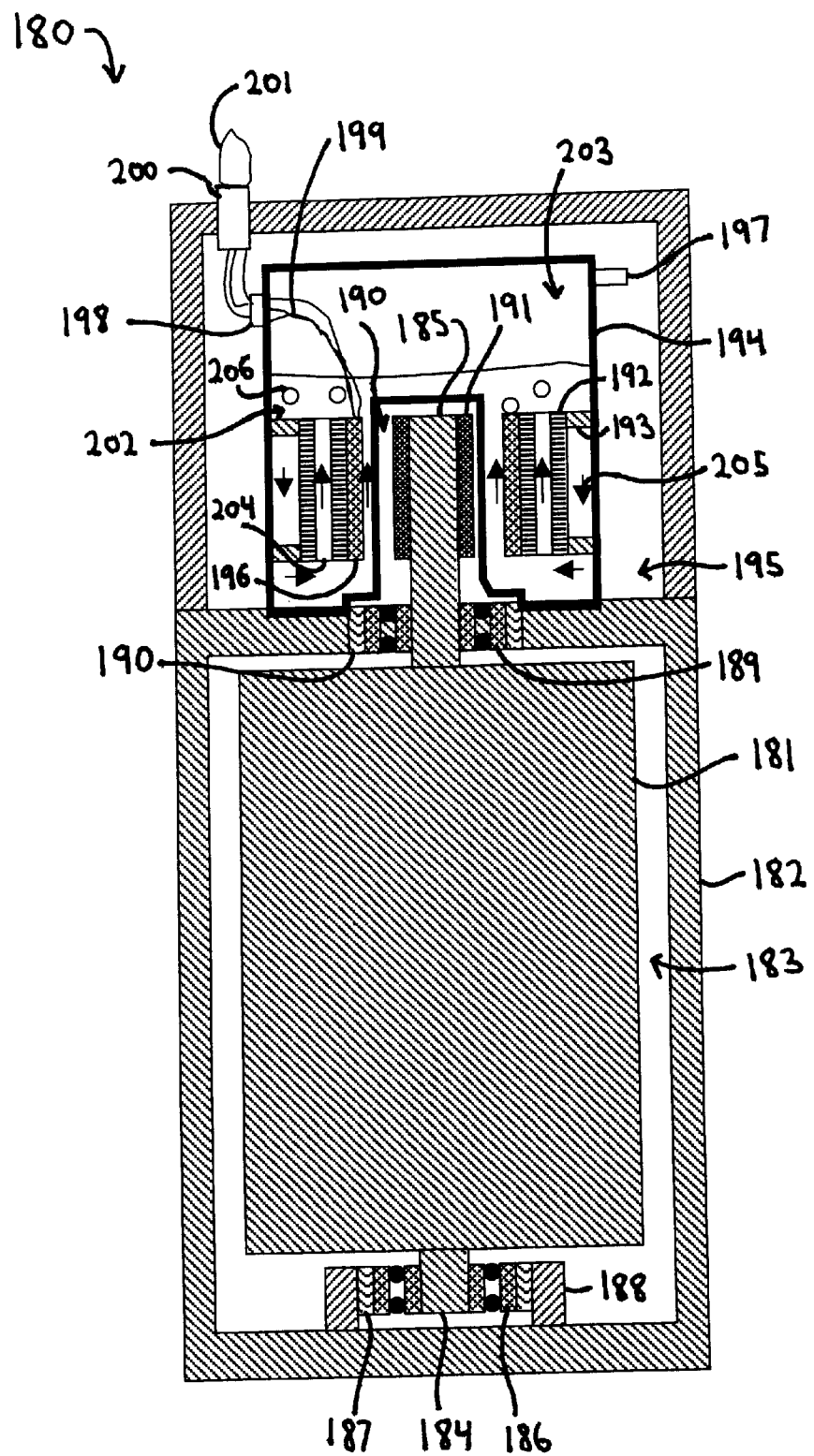
FIG. 10—Schematic drawing of a fourth alternate configuration flywheel power source with passive generator cooling in accordance with the invention.

A fourth alternate configuration flywheel power source with passive generator cooling in accordance with the invention is shown in FIG. 10. The flywheel power source 180 uses a flywheel 181 that rotates inside an evacuated chamber 183 inside a container 182. The flywheel has shafts 185 and 184 for journaling between bearings 189 and 186. The bearings 189, 186 are attached with mounts 190 and 187 to a bearing support 188 and the container 182. This configuration of flywheel power source illustrates the operation of boiling cooling and other possible system arrangements. The motor/generator 190 provides energy conversion with the flywheel 181. A permanent magnet rotor 191 is attached to the flywheel shaft 185. Surrounding the rotor 191 is the motor/generator stator. In this design, although not required for vaporization cooling systems, the stator vessel 194 is located outside the vacuum chamber 183. The floor of the stator vessel 194 is sealed to the top of the container 182 around the bearing mount 190 and actually provides a vacuum barrier with its inner walls. Having the stator vessel outer surface exposed to atmospheric pressure or an upper chamber 195 with potentially higher internal pressure can speed convective air heat transfer from the liquid in the vessel. However, this construction is more complex and costly than a sealed stator vessel located entirely inside the vacuum chamber.

The stator is comprised of laminations 192 and the electromagnetic Litz wire coils 196 are located inside the bore of the laminations 192. This allows the coils 196 to be air core providing faster current rise times. The stator vessel 194 encloses the laminations and the coils to provide cooling. Alternatively, if stator losses in the laminations 192 were not significant or of concern, the stator vessel could enclose just the coils 196. The stator laminations 192 show another embodiment with the invention by having axial through passages 204 for enhanced cooling from natural convection and boiling. A support structure 193 can be used to support the laminations 192 and windings 196. Support could also be provided on the axial ends or by other arrangements.

During high power operation of the flywheel power source 180, heat is transferred to the liquid and some liquid boils at the surface of the coils 196 and laminations 192. These bubbles increase the natural convection flow 204 and 205 enhancing convection cooling. The vaporization absorbs much of the heat energy by converting the liquid to gas. The gas bubbles 206 rise to the surface increasing the pressure in the empty space 203 inside the stator vessel. However, some of the bubbles condense in the fluid transferring heat energy to increase the average temperature of the fluid 202. Some of the gas created also condenses back to liquid after transferring heat energy to the stator vessel. As before, the motor/generator wires 199 exit the stator vessel through an electrical feedthrough 198 and a pinch-off tube 197 can be used to seal the vessel 194. The wires then exit the flywheel system 180 through another seal 200 and connect with external cabling.

The coolant vessel 194 in the embodiment of FIG. 10 could use the upper part of the container above the vacuum chamber 183 as the liquid vessel. Only the central cylinder of the stator vessel 194 around the rotor would remain, serving as the top of the vacuum chamber. The liquid coolant would thus be in direct contact with both the stator windings and the outside wall of the container, thereby enhancing the heat transfer to the surrounding ambient ground.

Figure 11:
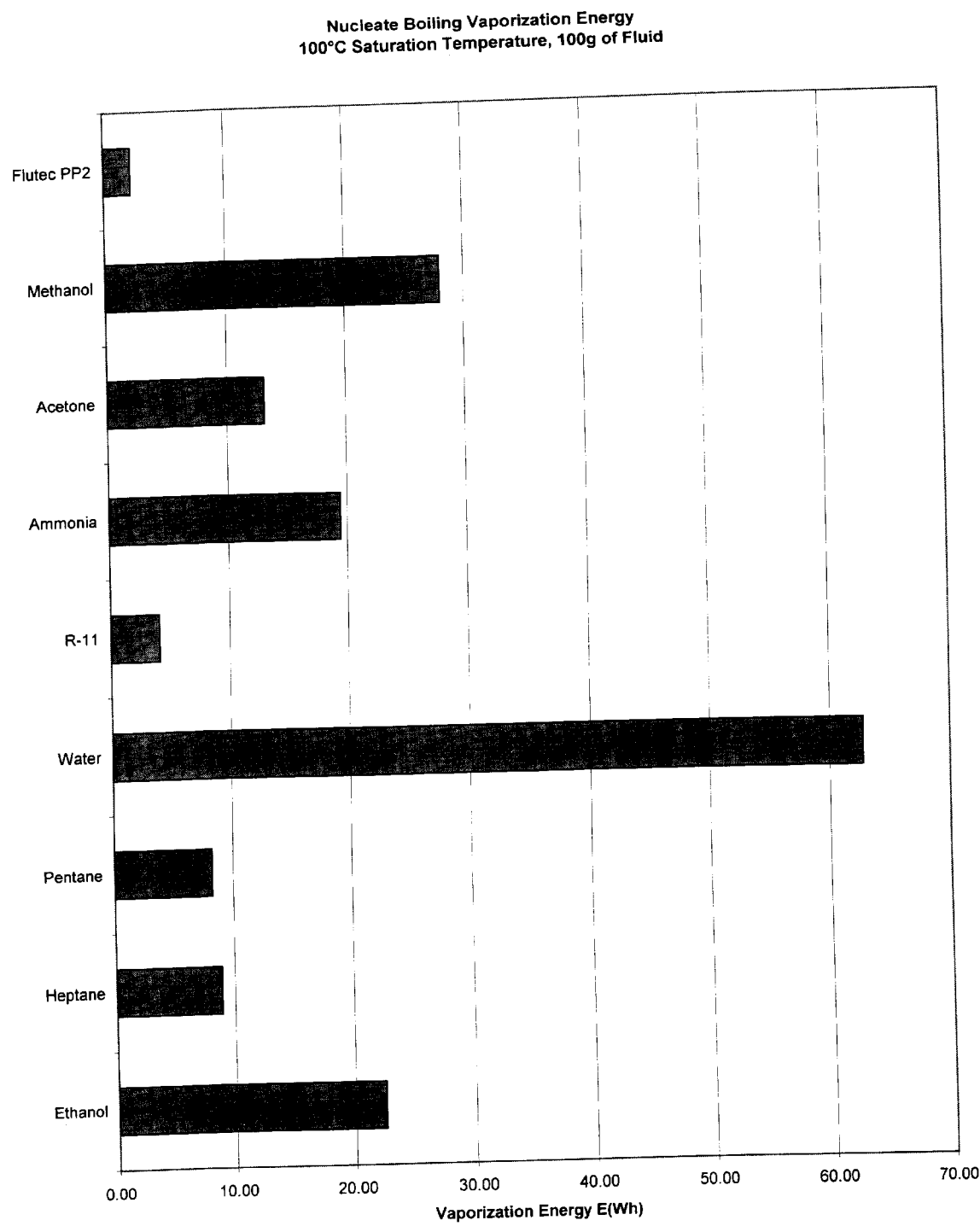
FIG. 11—Comparison of nucleate boiling vaporization energy for different cooling fluids.

One consideration in choosing the cooling liquid is the amount of heat energy that can be absorbed through vaporization. A comparison of nucleate boiling vaporization energy for different cooling fluids is shown in FIG. 11. The chart shows various fluids in 100 gram amounts and compares the energy absorbed through nucleate boiling. The boiling temperature of all liquids can be adjusted by adjusting the pressure inside the stator vessel. Increasing the pressure inside the vessel, increases the boiling temperature and decreasing the pressure, such as from pulling a vacuum prior to sealing the vessel, lowers the boiling temperature. All of the liquids shown are in a stator vessel with pressure adjusted for 100° C. boiling temperature. Water clearly absorbs the most energy of all the fluids shown.

Figure 12:
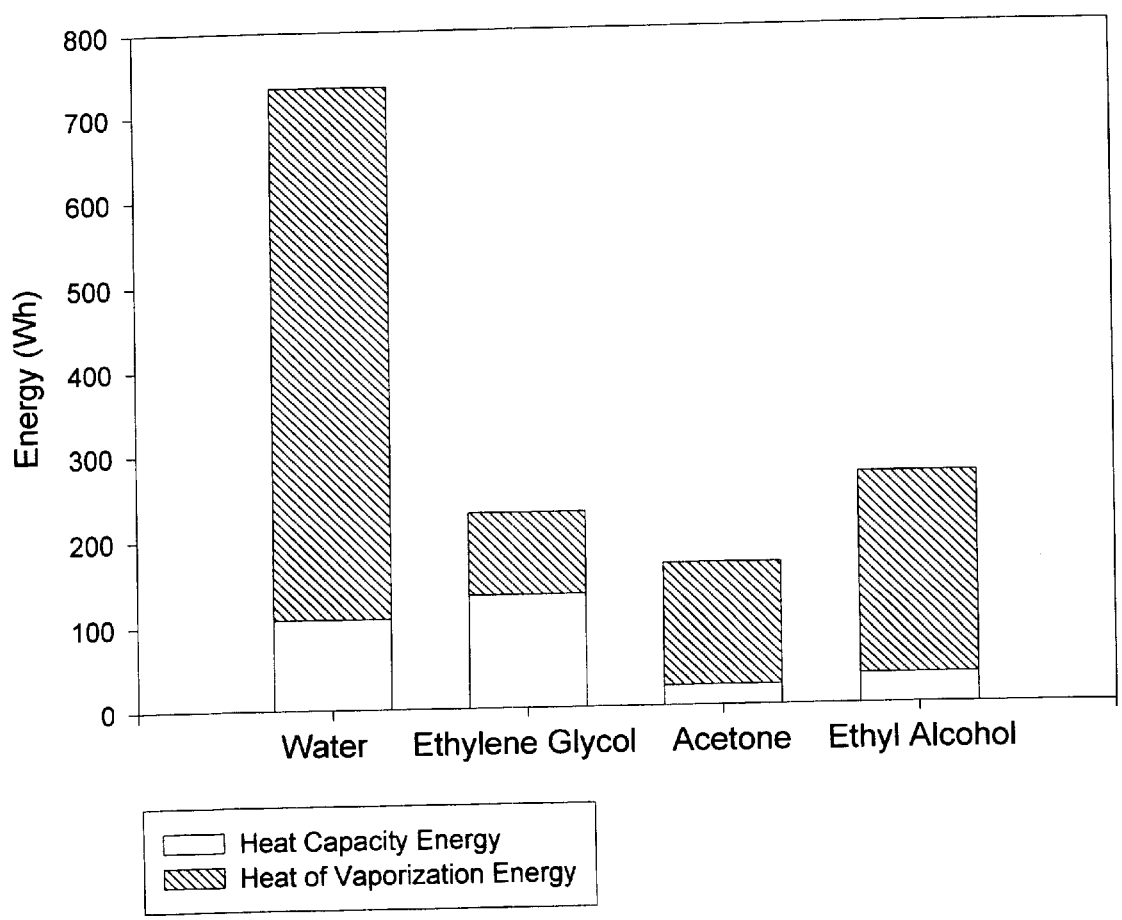
FIG. 12—Comparison of energy absorption capability of various coolant liquids.
Figure 13:
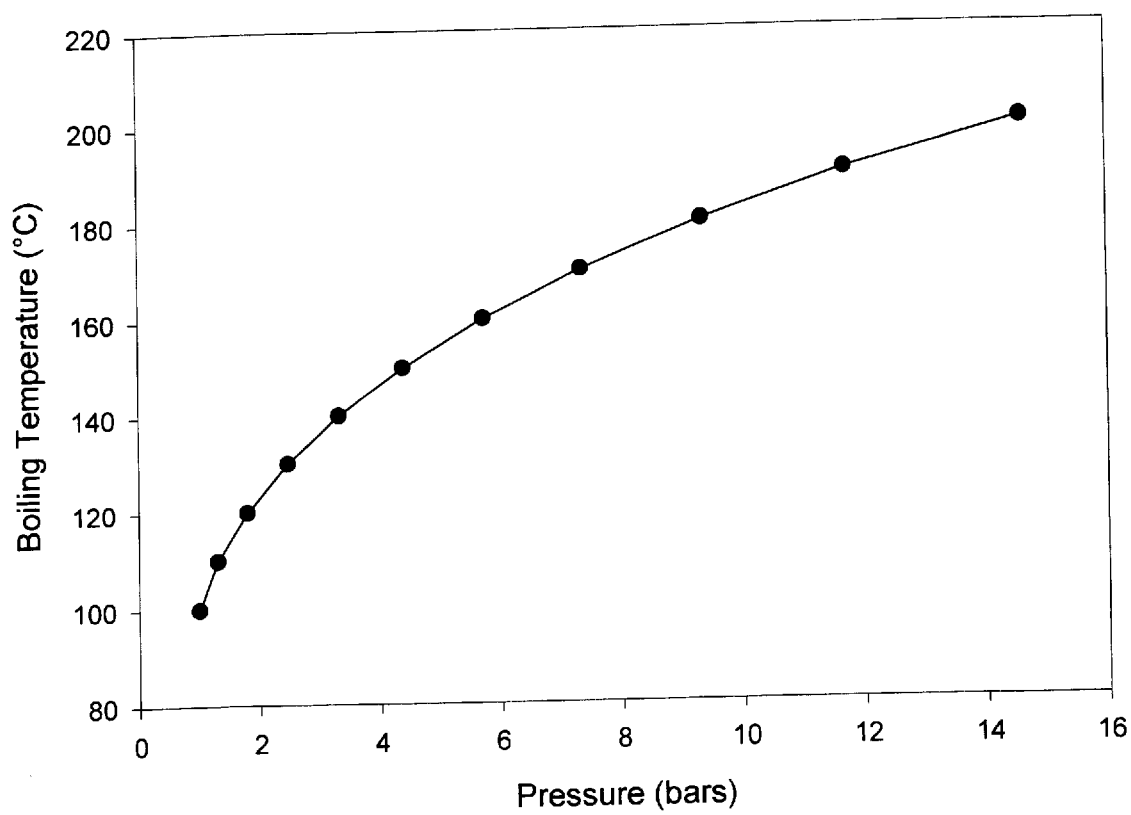
FIG. 13—Variation of boiling temperature with pressure for water.

When considering the total amount of energy to be absorbed from a complete high power flywheel discharge besides the maximum possible heat flux removal rate, the energy in the heat capacity of the fluid must also be considered. For example, the maximum heat flux of a given liquid and pressure will determine how hot the stator will get. However, the total energy absorption capability will determine the size of the stator vessel, design and amount of fluid required. Considering that subcooled boiling will be occurring and some of the vaporized liquid will condense during the high power cycle, heat energy will be transferred to the liquid raising the temperature and storing energy in the heat capacity of the liquid. A comparison of the energy absorption of various coolant liquids is shown in FIG. 12. All liquids are compared based on a 1 kilogram mass. The energy absorption in the liquid is the result of raising the temeperature of all of the liquid from room temperature to the boiling temperature of that liquid at atmospheric pressure and then converting that liquid to a gas by boiling. Increase in the stator vessel pressure is neglected in the chart. Because of the higher boiling temperature of ethylene glycol than water, more energy is absorbed in the heat capacity or raising the temperature of the liquid to the boiling temperature. However, the energy absorbed in boiling the liquid is maximum for water as shown. In a real flywheel power source, if all of the stator vessel liquid were converted to a gas, which is not desirable, the pressure would increase excessively inside the vessel. Having much extra liquid in the vessel is preferred to absorb the energy and prevent an excessive pressure increase from a flywheel discharge cycle. The pressure that does develop inside the stator vessel will have the effect of increasing the boiling temperature of the liquid. The boiling temperature of water versus pressure is shown in FIG. 13. Use of a mixture of vaporizing liquids with differing boiling points can also be used to reduce the surface tension of the liquid and to increase the temperature at which the lower boiling point liquid transitions to film boiling. This can further increase the energy absorption capability of the liquid.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein We claim:

We claim:

1. A flywheel power source, comprising:
   a flywheel supported by a bearing system for rotation inside an evacuated container;
   a brushless motor and generator for accelerating and decelerating said flywheel for storing and retrieving energy, said generator having a rotor and a stator;
   said rotor being coupled to said flywheel, and said stator being made of stationary coils that are wound with multiple-strand individually insulated conductor wire;
   a heat energy transfer system for passively cooling said stator by heat transfer from including a stator coolant vessel partially filled with said coolant, and said coolant circulates in said coolant vessel solely by natural convection;
   whereby said liquid coolant limits the maximum temperature of said coils reached during discharging of said flywheel power source.

2. A flywheel power source as described in claim 1 wherein:
   said motor and generator are combined.

3. A flywheel power source as described in claim 1 wherein:
   said generator has a power capacity of between about 100 kilowatts and 5 MW.

4. A flywheel power source as described in claim 1 wherein:
   said generator has a power capacity of more than about 100 KW for less than 2 minutes.

5. A flywheel power source as described in claim 1 wherein:
   said stator container is located inside said evacuated container.

6. A flywheel power source as described in claim 1 wherein:
   said flywheel rotates about a substantially vertical axis.

7. A flywheel power source as described in claim 1 wherein:
   said generator uses a laminated ferromagnetic stator and said stator container also contains said laminations.

8. A flywheel power source as described in claim 7 wherein:
   said laminations contain holes in which space said fluid can occupy.

9. A flywheel power source as described in claim 1 wherein:
   said liquid cools said stator by natural convection.

10. A flywheel power source as described in claim 9 wherein:
    said liquid is a transformer oil.

11. A flywheel power source as described in claim 1 wherein:
    said liquid cools said stator by absorbing energy through boiling.

12. A system as defined in claim 1 wherein:
    said stator container is constructed of metal of wall thickness less than 0.050" in the portion located between said rotor and said stator.

13. A flywheel power source as described in claim 12 wherein:
    said liquid has a viscosity at 40 degrees Celsius that is less than 200 mm²/sec.

14. A flywheel power source as described in claim 12 wherein:
    said stator container has multiple compartments that direct the flow of liquid by natural convection and increase its velocity over said coils.

15. A flywheel power source as described in claim 12 wherein:
    said stator container increases the buoyancy and liquid flow rate by containing liquid to a height substantially vertically above said coils.

16. A flywheel power source as described in claim 12 wherein:
    said stator container includes a radiator.

17. A flywheel power source as described in claim 12 wherein:
    said stator container has a surface that is outside of said vacuum container.

18. A flywheel power source as described in claim 12 wherein:
    said stator container is attached to a large heat sink.

19. A flywheel power source as defined in claim 18 wherein:
    said liquid has a boiling point at atmospheric pressure that is less than 150 degrees Celsius.

20. A flywheel power source as defined in claim 18 wherein:
    said liquid has a boiling point at the pressure inside said stator container at room temperature that is less than 150 degrees Celsius during normal fully charged operation prior to discharge.

21. A flywheel power source as defined in claim 18 wherein:
    said liquid is selected from a group consisting of fluorcarbon liquids, transformer oil, and water.

22. A flywheel power source as defined in claim 18 wherein:
    said liquid is comprised of two or more different liquids with boiling points that differ by 50 degrees Celsius or more.

23. A process of storing and recovering energy in a flywheel power source, comprising:
    accelerating a flywheel inside an evacuated container with a brushless motor, for storing energy in the form of rotational inertia of said flywheel;
    decelerating said flywheel with said generator a rotor and a stator for retrieving said stored energy in the form of electrical energy, said generator having a rotor coupled to said flywheel and a stationary stator having coils made of multiple-strand individually insulated conductor wire;
    passively cooling said stator by heat transfer from said stator to a liquid coolant surrounding said coils, said coolant and said stator being contained in a stator coolant vessel partially filled with said coolant, and said coolant circulates in said coolant vessel solely by natural convection;
    whereby said liquid coolant limits the maximum temperature of said coils reached during discharging of said flywheel power source.

24. The process as defined in claim 23, wherein:
    said cooling is by subcooled boiling of said coolant adjacent said coils, wherein said coolant stays at an average temperature below the boiling temperature of said coolant inside said vessel, but said coolant liquid boils locally at the stator liquid interface.

* * * * *